Patented Mar. 19, 1946

2,396,629

UNITED STATES PATENT OFFICE 2,396,629

FABRICATION OF POLYTETRAFLUORO-ETHYLENE ARTICLES

Johannes Alfthan and John L. Chynoweth, New York, N. Y., assignors to E. I. du Pont de Nemours & Company, Wilmington, Del., a corporation of Delaware No Drawing. Application March 29, 1944,
Serial No. 528,650

3 Claims. (Cl. 18—55)

This invention relates to a process for the fabrication of polytetrafluoroethylene articles and, more particularly, to a technique for baking polytetrafluoroethylene shaped bodies having a minimum dimension exceeding about one inch.

Heretofore it has been found that polytetrafluoroethylene articles may be fabricated by subjecting finely divided polytetrafluoroethylene to pressure to form a shaped body and then heating that shaped body to a temperature above 327° C. to sinter same. While this general process works exceedingly well in the fabrication of articles having a relatively small minimum dimension, difficulty has been encountered where the minimum dimension of the article being made exceeds about one inch. The articles formed have not been as a general rule free of flaws.

An object of the present invention is to provide a process for the fabrication of polytetrafluoroethylene articles and, particularly, for the fabrication of flawless polytetrafluoroethylene articles whose minimum dimension exceeds about one inch. A further object is to provide an improved technique for baking polytetrafluoroethylene shaped bodies. Other objects will be apparent from the description of the invention given hereinafter.

The above objects are accomplished according to the present invention by subjecting finely divided polytetrafluoroethylene to pressure to form a shaped body of polytetrafluoroethylene, heating the shaped body at a temperature of about 300° C.–327° C. until the temperature differential within the shaped body does not exceed 40° C. and the temperature in at least some portions of the shaped body is above 300° C., further heating the shaped body at a temperature of 327° C.–500° C. until it is sintered, the rate of increase in temperature above 327° C. not exceeding 35° C. per hour, cooling the resulting sintered shaped body at a rate not exceeding 50° C. per hour down to 300° C., and thereafter continuing the cooling at a rate not exceeding 80° C. per hour down to 250° C. Below 250° C., the rate of cooling is not particularly significant.

In carrying out the present invention, the shaped body may either be the final article or, more usually, a preform which after the sintering operation may be machined or otherwise treated to give the desired finished article.

In the formation of the shaped body, it is preferred to use a very finely divided polytetrafluoroethylene powder which may be obtained conveniently by polymerization of the tetrafluoroethylene in a violently agitated system or, alternatively, by subjecting the polymer to a mechanical subdivision step such as micropulverization. The particular method of obtaining the polytetrafluoroethylene in a finely divided form does not constitute a part of the present invention.

In forming the shaped body, the finely divided polytetrafluoroethylene is subjected to pressure, usually at atmospheric temperature. The pressure employed may vary between 50 lbs. and 10,000 lbs. per square inch, the specific pressure used in any particular instance depending largely upon the size and shape of the body to be formed. In general, it is preferred that a pressure between 1,000 lbs. and 3,000 lbs. per square inch be employed. It has been found advantageous in some instances to wet the polytetrafluoroethylene with a liquid such as ethyl alcohol or the like prior to this pressing step but this is not necessary. Obviously, where some liquid is used to wet the polymer, it must be removed from the preform prior to the baking or sintering step.

The invention will be more fully illustrated by the following examples:

*Example I*

A preform 6 x 1½ x 1½ inches was cut from a block which had been pressed from micropulverized polytetrafluoroethylene under 1,500 lbs. per square inch pressure. This preform was then placed in an oven and baked according to the following cycle of oven temperatures:

325° C. for 1½ hours
360° C. for 1 hour

The article was then cooled as follows:

345° C. for 1 hour
325° C. for 1 hour

The temperature was then decreased to 25° C. over a 10 hour period (30° C./hour decrease. This article, upon X-ray examination, was free from flaws.

In contrast to the procedure of Example I given above, a polytetrafluoroethylene preform identical to that in Example I was placed directly into an oven maintained at 360° C.; after one hour it was thoroughly sintered and was then cooled according to the cycle above. X-ray examination showed flaws in the article in the form of voids and cracks.

On the other hand, four preforms identical to that used in Example I were baked according to the schedule in Example I but were cooled as follows:

Preform A was water quenched directly from 360° C.

Preform B was removed from the oven and air cooled directly from 360° C.

Preform C was cooled by reducing the temperature from 360° C. to 345° C. and held there for one hour and then held at 325° C. for one hour following which it was water quenched.

Preform D followed a procedure identical to that used with Preform C except that it was air cooled in place of water quenched.

Each of the above preforms exhibited flaws on X-ray examination, the severity of the flaws decreased from A to D.

It will thus be seen from the variations in the procedure of Example I that failure to observe the conditions and limitations of the present invention will not result in a flawless article where the minimum dimension of the article is in the neighborhood of one inch or greater.

*Example II*

Polytetrafluoroethylene micropulverized powder wet with 50%, by weight thereof, of ethyl alcohol, was pressed into a ring under 1,500 lbs. per square inch pressure. This ring had the following dimensions: inside diameter 6½ inches; outside diameter 10½ inches; thickness 2 inches. Residual alcohol was removed by seasoning for 12 hours at 70° C. The ring was then baked according to the following cycle of oven temperatures:

325° C. for two hours
360° C. for two hours

The article was then cooled according to the following cycle:

340° C. for two hours
325° C. for two hours
250° C. for two hours

The article was then removed from the oven and plunged into water maintained at a temperature of 15° C. The resulting ring was free from flaws when inspected by X-ray. Tape, shaved from this ring, was free from visible flaws and served as an excellent insulator for an electrical conductor.

*Example III*

A truncated cone 5.9 inches high; 2.6 inches top diameter; 2.7 inches bottom diameter, was pressed from micropulverized polytetrafluoroethylene. This preform was then baked according to the following cycle:

150° C. for one hour
225° C. for one hour
300° C. for one hour
330° C. for one hour
360° C. for one hour and cooled by decreasing the temperature at a rate substantially equal to 30° C./hour. The article so produced was free from flaws.

*Example IV*

A preform 10 x 12 x 1½ inches was pressed from powdered polytetrafluoroethylene under 1,500 lbs. per square inch pressure. A sample 6 x 1½ x 1½ inches was cut from this cake and baked in a hot air oven according to the following cycle:

200° C. for 1½ hours
327° C. for 1½ hours
340° C. for 1½ hours
355° C. for 3 hours The article was then cooled according to the following cycle:

341° C. for 1½ hours
327° C. for 1½ hours cooled gradually at a rate less than 30° C. per hour down to 250° C. and continued cooling gradually to 25° C. The sample so baked was free from flaws.

It will be understood that the above examples are merely illustrative and that the invention broadly comprises heating the shaped body of polytetrafluoroethylene at a temperature of about 300° C.–327° C. and then further heating at a temperature above 327° C. until the body is sintered, the temperature being raised at a rate not exceeding 35° C. per hour, and then cooling the sintered body to below 300° C. at a rate not exceeding 30° C. per hour, and continuing the cooling down to at least about 250° C. at a rate not exceeding 80° C. per hour.

The process of the present invention is applicable both to polytetrafluoroethylene and to mixtures of polytetrafluoroethylene with other components such as powdered copper, iron, lead, brass, bronze, graphite, asbestos, silica, calcium chloride, sodium chloride, ammonium chloride, ammonium nitrate, titanium dioxide, or the like. These materials may be mixed in the form of fibers with the polytetrafluoroethylene where that is more convenient.

The process is also applicable to interpolymers of polytetrafluoroethylene with other polymerizable compounds such as isobutylene or ethylene although this generally is not necessary as more conventional means may be used for fabrication of articles from interpolymers.

The density of the formed bodies, before sintering, is normally greater than 1.4 and, frequently, is in the neighborhood of 1.8 to 2. After sintering, the density is generally between 2 and 2.2 but this will vary depending upon the pressure used in shaping the body and the degree of subdivision of the polytetrafluoroethylene.

Example I and the variations of the procedure outside the present invention, as set forth immediately after Example I, serve to illustrate that with articles having a least dimension of about an inch or more the particular manner of baking and cooling of the present invention must be closely followed to avoid flaws in the finished article. Preferably, the pressed body is preheated for a time at about 250° C. before it is heated at about 300° C.–327° C. Heating at about 300° C.–327° C. is necessary and this heating preferably should be extended until the center of the shaped body has reached 300° C. and the manner of heating should be such that the temperature differential between various portions of the body does not exceed 40° C. To sinter the body, the temperature must be raised above 327° C. and the increase in temperature must not be at a rate in excess of 35° C. per hour. There is no particular advantage in exceeding a temperature of 500° C., more often it is disadvantageous, and usually the sintering can be effected more satisfactorily at a considerably lower temperature.

The duration of the sintering period requisite to give a uniform article may be determined for any article by insertion of a thermocouple in the center of a sample piece of the desired dimensions. The piece is then held at the sintering temperature until its center exceeds 327° C. The time required for the center to reach this temperature is thereafter applicable to similar pieces. The heating operation may be carried out by subjecting the shaped body to a hot atmosphere such as by heating in an electric furnace, a gas furnace, or the like, or it may be heated by contact with a liquid such as hot oil, a molten metal or alloy, or a molten mixture of inorganic salts. The use of radiant energy is likewise applicable in the baking operation of this invention.

Not only is the manner of heating important in the production of flawless articles of polytetrafluoroethylene, but the manner of cooling also plays an important part. Until the article is cooled to below 300° C., the cooling should not be at a rate in excess of 30° C. per hour. From 300° C. down to 250° C., the cooling may be accelerated to a rate as high as 80° C. per hour. After reaching 250° C., the rate of cooling does not have a marked effect and it is usually more convenient to accelerate the cooling considerably from this temperature down.

The present invention is applicable broadly to the baking of polytetrafluoroethylene articles although its greatest advantage is in baking polytetrafluoroethylene articles having a least dimension of about one inch and up since the formation of flaws is more apt to be encountered in articles of these thicker sections unless the particular method of the present invention is employed.

As many apparently widely different embodiments of this invention may be made without departing from the spirit and scope thereof, it is to be understood that the invention is not limited to the specific embodiments thereof except as defined in the appended claims.

We claim:

1. Process for the fabrication of polytetrafluoroethylene articles which comprises subjecting finely divided polytetrafluoroethylene to pressure to form a shaped body of polytetrafluoroethylene, heating said shaped body at a temperature of about 300° C.–327° C. until the temperature in at least some portions of the body is above 300° C. and the temperature differential within the shaped body does not exceed 40° C., further heating the shaped body at a temperature above 327° C. until sintered, the rate of increase in temperature above 327° C. not exceeding 35° C. per hour, cooling the resulting sintered shaped body at a rate not exceeding 30° C. per hour to below about 300° C., and thereafter continuing said cooling at a rate not exceeding 80° C. per hour to below about 250° C.

2. Process for the fabrication of polytetrafluoroethylene articles which comprises subjecting finely divided polytetrafluoroethylene to pressure to form a shaped body of polytetrafluoroethylene, heating said shaped body at a temperature of about 300° C.–327° C. until the temperature in at least some portions thereof is above 300° C. and the temperature differential within the shaped body does not exceed 40° C., further heating the shaped body at a temperature above 327° C. but not in excess of 500° C. until sintered, the rate of increase in temperature above 327° C. not exceeding 35° C. per hour, cooling the resulting sintered shaped body at a rate not exceeding 30° C. per hour to below about 300° C., and thereafter continuing said cooling at a rate not exceeding 80° C. per hour to below about 250° C.

3. Process for the fabrication of polytetrafluoroethylene articles which comprises subjecting finely divided polytetrafluoroethylene to a pressure of 1,000–3,000 lbs. per square inch to form a shaped body of polytetrafluoroethylene, preheating said shaped body at a temperature of about 250° C., heating said shaped body at a temperature of about 300° C.–327° C. until the temperature in at least some portions thereof is above 300° C. and the temperature differential within the shaped body does not exceed 40° C., further heating the shaped body at a temperature above 327° C. but not in excess of 500° C. until sintered, the rate of increase in temperature above 327° C. not exceeding 35° C. per hour, cooling the resulting sintered shaped body at a rate not exceeding 30° C. per hour to below about 300° C., and thereafter continuing said cooling at a rate not exceeding 80° C. per hour to below about 250° C.

JOHANNES ALFTHAN.
JOHN L. CHYNOWETH.